United States Patent

Wieske

[11] 4,045,588
[45] Aug. 30, 1977

[54] MARGARINE FAT

[75] Inventor: Theophil Wieske, Hamburg, Germany

[73] Assignee: Lever Brothers Company, New York, N.Y.

[21] Appl. No.: 650,999

[22] Filed: Jan. 21, 1976

Related U.S. Application Data

[63] Continuation of Ser. No. 501,946, Aug. 29, 1974, abandoned.

[51] Int. Cl.² .............................................. A23D 3/00
[52] U.S. Cl. ................................... 426/607; 426/603
[58] Field of Search ............................... 426/603, 607

[56] References Cited

U.S. PATENT DOCUMENTS

| | | | |
|---|---|---|---|
| 2,921,855 | 1/1960 | Melnick et al. | 426/603 |
| 2,955,039 | 10/1960 | Melnick et al. | 426/607 X |
| 3,353,964 | 11/1967 | Seiden | 426/607 |
| 3,617,308 | 11/1971 | Graffelman | 426/607 X |
| 3,634,100 | 1/1972 | Fondu et al. | 426/607 |
| 3,682,656 | 8/1972 | Wilton et al. | 426/603 |
| 3,796,581 | 3/1974 | Frommhold | 426/607 X |

*Primary Examiner*—Joseph M. Golian
*Attorney, Agent, or Firm*—Melvin H. Kurtz

[57] ABSTRACT

The invention relates to fat compositions of a relatively high liquid oil content, which compositions are suitable for preparing margarines with a high percentage of polyunsaturated fatty acids. The fat compositions of the invention contain, apart from said liquid oil, 5–30% of a hard fat of a well-defined fatty acid and triglyceride composition, i.e. 25–60% H3 and H2T triglyceride, 30–70% H fatty acids, 10–45% T fatty acids, 0–25% M fatty acids, 15–45% M + T fatty acids, the balance being L fatty acids, (H, T, M and L stand for saturated fatty acids with 16–24 carbon atoms, mono-trans unsaturated fatty acids with 16–24 carbon atoms, saturated fatty acids with 12–14 carbon atoms and the remainder, being 100-(H + T + M)% respectively).

5 Claims, No Drawings

MARGARINE FAT

This is a continuation of application Ser. No. 501,946, filed Aug. 29, 1974, now abandoned.

The invention relates to fat compositions which can be used in the preparation of margarines of a high polyunsaturated fatty acid content, to margarines prepared therefrom and to processes for their preparation.

Margarines with a high content of polyunsaturated fatty acids, which acids are provided by "liquid oils", and a relatively low content of saturated fatty acids are from a dietetic point of view important. Such margarines are mostly easily spreadable even at the temperature which is generally maintained in a refrigerator, i.e. about 3°-8° C. In addition such margarines should show sufficient stand-up or in other words be sufficiently hard at room temperatures. This requirement, however, limits the liquid oil content in the margarine fat.

The fat compositions of the present invention comprise a liquid oil of a polyunsaturated fatty acid content of at least 40% and 4-30% of a hard fat containing:

25-60% of H3 and H2T triglycerides
37-70% of H fatty acids
20-35% of T fatty acids
0-25% of M fatty acids
15-45% of M + T fatty acids,
the balance being L fatty acids, to provide 0.2-5% H3 triglycerides in the fat composition. Preferably the H2T content of the hard fat component is higher than the H3 content, and the content of H fatty acids is from 40-60%, and M + T fatty acids from 20-35%.

In this specification by H fatty acids are understood saturated fatty acids with 16-24 carbon atoms; T fatty acids: mono-trans-unsaturated-fatty acids with 16-24 carbon atoms; M fatty acids: saturated fatty acids with 12-14 carbon atoms; L fatty acids: the remainder, being 100-(H+T+M)%; H3triglycerides: triglycerides containing 3H fatty acids per molecule; and H2T triglycerides: mixed triglycerides containing two H and one T fatty acids per molecule.

All parts, proportions and percentages are by weight; the amount of polyunsaturated fatty acids in the liquid oil is based on the total amount of fatty acids in said liquid oil; the amounts of H, T, M and L fatty acids in the hard fat are based on the total amount of fatty acids in said hard fat; the amounts of H3 and H2T triglycerides in the hard fat are based on the total weight of the hard fat the amounts of hard fat and H3 triglycerides in the total fat composition are based on the weight of said fat composition, unless otherwise stated.

In this specfication by the term "liquid oil" is understood a mixture of triglycerides which is liquid at temperatures of 5°, particularly 0° C. A "margarine fat" is a fat blend which is suitable for use as the sole fat in margarine and which can contain substantial proportions of liquid oils. The term "randomizing" which is also used in this specification refers to the interchange of fatty acid radicals of the triglycerides on the glyceryl radicals in random fashion. This interchange, when applied to at least two different fat sources, is called "co-randomizing". Randomizing can for instance be effected under the influence of an interesterification catalyst at temperatures of about 25°-175° C, preferably 80°-140° C. Suitable catalysts are e.g. alkali metals, their alloys, their hydroxides, and their alkoxides, and are employed e.g. in proportions of 0.01%-0.3 or 0.5% by weight of the fats to be interesterified.

It is essential that a hard fat component to be used in the fat composition of the invention is for at least 50%, preferably at least 80% randomized or corandomized in order to provide the required H3 and H2T content.

As compared with fat compositions containing the same content of randomized substantially fully saturated (thus substantially T-free) hard fat components, the products of the present invention are harder at temperatures e.g. from 5°-25° C, without the melting properties, in the mouth, reflected in dilatation values at 35° C, being adversely affected.

As compared with a fat composition containing the same content of non-randomized hard fat that contains sufficient T acids, the products of the present invention have better dilatation values at 35° C.

As compared with a fat composition containing the same content of non-randomized substantially fully saturated, thus T-free, hard fat, the products of the present invention are harder at temperatures from 5°-25° C and/or have better dilatation values at 35° C. A margarine of good melting properties in the mouth should have a fat composition of a dilatation value of at most 70, preferably at most 50, at 35° C.

The dilatation values as described in this specification are determined by the method described in Boekenoogen: "Analysis and characterisation of oils, fats and fat products", 1964, Interscience Publishers, London, pages 143–145.

The hardness values are determined by the method of Haigton as described in J.A.O.C.S, 36 (1959) pages 345–348. Thus the products of the invention have, as compared with prior art products of similar high polyunsaturated fatty acid content, better melting properties in the mouth and/or are harder at use temperatures, e.g. from 5°-25° C. The improved hardness makes such products more closely resemble fats or fat blends present in butter and conventional margarine of a lower polyunsaturated fatty acid content. Vice versa the products of the invention can have a higher polyunsaturated fatty acid content than the liquid oil containing prior art products of the same hardness values.

The hard fat component to be used in the fat composition of the invention can consist of one randomized or corandomized hard fat or hard fat blend or two or more randomized or corandomized hard fats or hard fat blends; at least part of at least one of the hard fats should prior to or after the randomizing treatment have been subjected to a hydrogenation treatment under conditions favouring the formation of T acid radicals. Such a hydrogenation treatment can e.g. be effected in a manner known per se at temperatures ranging from about 140°-180° C in the presence of e.g. sulphur poisoned nickel catalysts. The T content of the individual constituents of the hard fat component is not of major importance as long as the total hard fat component comprises the proportions of H, T, M and L acids and H3 and H2T triglycerides described before.

Preferably the fat compositions of the invention contain 8-20% particularly 9-15% of hard fat, particularly hard fat obtained by corandomizing one mixture of two or three fats, at least one of which being a T acid containing hydrogenated fat.

Suitable hard fat components can consist of e.g. a corandomized mixture of two or three hydrogenated fats of slip-melting point ranging from 32°-70° C, particularly 35° to 45° C or 55° to 60° C, selected from hydrogenated coconut, palm kernel, palm, rapeseed, cottonseed, groundnut oil, as well as the hydrogenated oils originally containing at least 40% of polyunsaturated fatty acids. Alternatively the hard fat component can consist of one radomized fat of the above listed class of fats, particularly in admixture with a second hydrogenated fat listed above, particularly in randomized fashion.

The melting point as used in this specification is a slip melting point as defined in Bailey: "Melting and Solidification of Fats", 1950, page 110.

The randomizing or co-randomizing treatment is carried out by either interesterification of a suitable hard fat or hard fat blend, preferably containing at least two hard fats, or by esterifying glycerol with a suitable mixture of fatty acids. The fat can be interesterified batchwise or continuously using suitable catalysts, e.g. alkali metals, their hydroxides, their alkoxides and soaps, sodamite and titanium tetra alkoxides.

The interesterification can for instance be carried out as follows: the mixture of fats is dried to a water content below 0.03% by weight and subsequently interesterified at temperatures of 110°–140° C in a stirred vessel which has been under a vacuum of e.g. 2 mm mercury in the presence of 0.01 to 0.3% or 0.5% by weight of sodium ethoxide as a catalyst. After about 20 minutes the vacuum is released. The catalyst is destroyed by washing the interesterified mixture e.g. with water and afterwards the mixture is dried as before.

If a hard fat component obtained by esterifying a suitable mixture of fatty acids with glycerol is used, the esterifying treatment can be carried out as follows:

1 part of glycerol is mixed with about 3.5 to 3.8 parts of the fatty acids blend. The mixture of fatty acids and glycerol is rapidly heated in a jacketed vessel to a temperature of about 190° C. and subsequently maintained, for at least three hours, at a temperature of 220° to 225° C. The reaction is carried out, while stirring under atmospheric pressure in a vessel which is closed from the air by nitrogen. During the reaction, water is removed by distillation. After 3 to 4 hours reaction time, the free fatty acid content of the mixture is determined. When the free fatty acid content remains unchanged, the reaction is finished and the excess of fatty acids is removed by distillation at a temperature of 240° C, at a pressure of 5 mm mercury. During distillation the free fatty acid content is determined again and as soon as an acid value of 4 is obtained, the reaction is stopped and the product is cooled to a temperature of 90° C. The hard fat mixture obtained is subsequently alkali-refined and bleached.

Liquid oils containing at least 40% of polyunsaturated fatty acids, especially the essential fatty acids, are: safflower, sunflower, soyabean, wheat germ, grapeseed, poppyseed, tobaccoseed, rye, walnut and corn oil as well as mixtures and fractions of these oils with high proporties of linoleic acid. Also cottonseed oil can be used, but preference is given to those liquid oils which apart from a high content of essential fatty acids have only low amounts of saturated fatty acids, e.g. less than about 30%. Sunflower oil is produced in large quantities and has an excellent taste owing to a good oxidation stability. Therefore, it is preferably present in the fat compositions of the present invention.

In making margarines, or other edible plastic fat-in-water emulsions, the edible fat composition can be emulsified in a conventional way with an aqueous phase, at a temperature at which the fat composition is liquid. The emulsion is then subjected to rapid chilling, in a conventional surface-scraped heat exchanger, e.g. a Votator apparatus, as described in "Margarine" by Andersen and Williams, Pergamon Press (1965), page 246 et seq. Usually the liquid emulsion is e.g. chilled from a temperature of 35° to 45° C. with a Votator-A unit to a temperature of 5°–25° C and after passing a resting tube, e.g. a Votator-B unit, the margarine is wrapped. When the margarine in liquid form is filled into tubs the liquid emulsion is passed though one or more surface-scraped heat exchangers and directly filled into these tubs.

The aqueous phase can contain additives which are customary for margarine, for example emulsifying agents, salt and flavours. Oil-soluble additives e.g. flavouring compounds, vitamins etc. can included in the fatty phase. Generally the proportion of fatty phase in a margarine varies from about 75 to 80% of the emulsion depending on local statutory requirements for margarine. Alternatively higher proportions of the aqueous phase can be adopted in the production of so-called low-fat spreads, which can contain as little as 35, 40 or 50 up to 60% by weight of fat.

It is a great advantage of the present invention, that margarine fats can be prepared containing a small amount of the hard fat component and consequently a large quantity of liquid oil from which margarine can be made of sufficient hardness for tub-filling or even for wrapping in a parchment wrapper. In the latter case preferably 10% or more of a hard fat component will be incorporated in the fat composition of the present invention.

The invention will now be illustrated by the following examples:

EXAMPLE I

A hard fat was prepared by randomizing a refined fat blend consisting of:

58 wt.% soyabean oil hydrogenated to a slip melting point of 43° C. The H content of this hydrogenated fat was 30%, the T content 55%.

42 wt.% palm oil hydrogenated to a slip melting point of 58° C. The H content of this hydrogenated fat was 98%, the M content 1%.

10 wt.% Of the randomized hard fat containing

| | |
|---|---|
| 60.0% | H acids |
| 32 % | T acids |
| 0.5% | M acids |
| 23.2% | H3 triglycerides |
| and 34.2% | H2T triglycerides | was mixed with 90% sunflower oil to provide a margarine fat having hardness values (determined by the method of Haighton as described in J.A.O.C.S, 36 (1959) pages 345–348) of 250 at 5° C and 110 at 20° C and a dilatation value at 35° C of 35.

EXAMPLE II

Example I was repeated, except that now 8.5% of the randomized hard fat was mixed with 91.5% of safflower oil. The margarine fat obtained had hardness value at 5° C of 190 and at 20° C of 80 and a dilatation value at 35° C of 20.

EXAMPLE III

Example I was repeated except that a randomized hard fat was used consisting of 90 wt.% palm oil hydrogenated to a melting point of 42° C (H=51%, T=30%)

10 wt.% rapeseed oil hydrogenated to a melting point of 70° C (H=99%, T=1%)
the hard fat contained
55% of H acids
27% of T acids
1% of M acids
H3 triglycerides 16.5%
H2T triglycerides 25.5%.

The hardness values of the margarine fat obtained were 260 at 5° C and 100 at 20° C and the dilatation value at 35° C was 20.

Similar favourable results were obtained by blending 14% of the interesterified hard fat with 86% of sunflower oil, safflower oil, wheat germ oil or corn oil.

EXAMPLE IV

An excellent margarine fat was prepared by blending 25 wt.% sunflower oil and 50 wt.% cottonseed oil,
10 wt.% of a corandomized hard fat component of Example III, 13.5 wt.% of a randomized hydrogenated soyabean oil of a melting point of 43° C (H=30%, T=55%), 1.5 wt.% of a non-randomized hydrogenated rapeseed oil of a melting point of 70° C (H=99%, T=1%).

The total hard fat obtained contained:
44% of H acids
40% of T acids
0% of M acids
13.8% of H3 triglycerides and 17.0% of H2T triglycerides.

The dilatation value at 35° C was 50. The hardness value at 5° C was 600 and at 20° C 150.

EXAMPLE V

Example IV was repeated except that only 10% of the hard fat component was used in which the hydrogenated soyabean oil was replaced by hydrogenated sunflower oil of the same melting point; the weight ratio of the individual hard fat constituents remained unchanged as well as the content of H, T and M fatty acids and the H3 and H2T triglycerides. This hard fat component was mixed with 90% of corn oil. The dilatation value at 35° C was 25. The hardness values were 250 at 5° C and 90 at 20° C.

EXAMPLE VI

Margarines were prepared from the fat compositions of Examples I–V as follows:

The margarine fat blend was melted and emulsified with an aqueous phase prepared from soured milk containing 0.1% monodiglycerides to give an emulsion containing 80% of fat.

The emulsion was crystallized and worked in a closed tubular surface-scraped heat exchanger (Votator A-Unit), which was left at a temperature of 15° C. The cooling temperatures in the A-unit were from −6° to 10° and 40% of the treatment emulsion was recirculated. Thereafter the crystallized emulsion was passed through a resting tube (Votator B-unit), where it crystallized further for 160 sec. and was then liquid-filled into tubs. The hardness values and the dilatation values of the products obtained hardly differed from those mentioned in the various examples.

I claim:

1. Margarine fat consisting essentially of (a) a liquid vegetable oil having a polyunsaturated fatty acid content of at least 40% and (b) 5–30% of a hard fat containing:
   I. 25–60% of triglycerides containing three saturated fatty acids with 16–24 carbon atoms and triglycerides containing two saturated fatty acids with 16–24 carbon atoms and one mono-trans-unsaturated fatty acid with 16–24 carbon atoms,
   II. 35–70% of saturated fatty acids with 16–24 carbon atoms,
   III. 20–35% of mono-trans-unsaturated fatty acids with 16–24 carbon atoms,
   IV. 0.25% of saturated fatty acids with 12–14 carbon atoms,
   V. 15–45% of saturated fatty acids with 2–14 carbon atoms and mono-trans-unsaturated fatty acids with 16–24 carbon atoms,
   VI. the balance being the remaining fatty acids, to provide from 0.2–5% triglycerides containing three saturated fatty acids with 16–20 carbon atoms in the margarine fat.

2. Margarine fat composition according to claim 1 in which the the content of triglycerides containing two saturated fatty acids with 16–24 carbon atoms and one mono-trans-unsaturated fatty acid with 16–24 carbon atoms of the hard fat component is higher than the triglycerides containing three saturated fatty acids with 16–24 carbon atoms.

3. Margarine fat composition according to claim 1 containing 9–15% of hard fat.

4. Margarine fat composition according to claim 1 containing a hard fat obtained by co-randomizing one mixture of two or three fats, at least one of which being a mono-trans-unsaturated fatty acid with 16–24 carbon atoms containing hydrogenated fat.

5. Margarine fat composition according to claim 4 in which a mixture of two or three hydrogenated fats of a slip melting point ranging from 32°–70° C is used.

* * * * *